(12) United States Patent
Khafagy et al.

(10) Patent No.: US 10,421,457 B2
(45) Date of Patent: Sep. 24, 2019

(54) METHOD FOR OPERATING AN AUTOMATIC START/STOP SYSTEM IN A VEHICLE UTILIZING A TORQUE CONVERTER

(71) Applicant: Ford Global Technologies, LLC, Dearborn, MI (US)

(72) Inventors: Hafiz Shafeek Khafagy, Dearborn, MI (US); Siraj Siddiqui, Lasalle Ontario (CA); Yuji Fujii, Ann Arbor, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 15/145,267

(22) Filed: May 3, 2016

(65) Prior Publication Data
US 2017/0320497 A1 Nov. 9, 2017

(51) Int. Cl.
*B60W 30/18* (2012.01)
*B60W 10/02* (2006.01)
*B60W 10/06* (2006.01)
*F02N 11/08* (2006.01)
*F16H 61/14* (2006.01)

(52) U.S. Cl.
CPC .... *B60W 30/18072* (2013.01); *B60W 10/026* (2013.01); *B60W 10/06* (2013.01); *F02N 11/0855* (2013.01); *F16H 61/143* (2013.01); *B60W 2030/1809* (2013.01); *B60W 2510/182* (2013.01); *B60W 2510/305* (2013.01); *B60W 2520/10* (2013.01); *B60W 2540/10* (2013.01); *B60W 2710/024* (2013.01); *B60W 2710/0627* (2013.01); *F16H 2312/14* (2013.01)

(58) Field of Classification Search
CPC ...... F16H 2312/14; B60W 2510/0233; B60W 2710/024
See application file for complete search history.

(56) References Cited

U.S. PATENT DOCUMENTS 6,019,202 A * 2/2000 Anwar ................. B60W 10/02
192/13 R
6,754,579 B2 * 6/2004 Kamiya ............... B60W 10/06
477/203

(Continued)

OTHER PUBLICATIONS

"https://math.stackexchange.com/questions/1893988/how-should-we-calculate-difference-between-two-numbers"; Retrieved Sep. 4, 2017.*

(Continued)

*Primary Examiner* — Tisha D Lewis
(74) *Attorney, Agent, or Firm* — David B. Kelley; Brooks Kushman P.C.

(57) ABSTRACT

A system and method for operating an automatic start/stop system in a motor vehicle having an internal combustion engine, an automatic transmission and a torque converter with an impeller disconnect clutch is disclosed. A controller may implement an engine start/stop system by, at appropriate times, stopping engine by halting fuel and restarting engine when propulsion is needed. During an engine start/stop event, the engine is automatically shut down and the impeller clutch of the torque converter may be disengaged to decouple the impeller and the engine to provide for fuel and emissions savings.

19 Claims, 3 Drawing Sheets

(56) References Cited

U.S. PATENT DOCUMENTS

| | | | | |
|---|---|---|---|---|
| 2002/0028726 | A1* | 3/2002 | Morimoto | F02D 17/04 |
| | | | | 477/102 |
| 2003/0004635 | A1* | 1/2003 | Kamiya | B60W 10/06 |
| | | | | 701/112 |
| 2009/0118886 | A1* | 5/2009 | Tamai | B60W 20/11 |
| | | | | 701/22 |
| 2009/0127050 | A1 | 5/2009 | Ari et al. | |
| 2012/0080001 | A1* | 4/2012 | Saito | F02N 11/0822 |
| | | | | 123/179.4 |
| 2012/0265427 | A1 | 10/2012 | Petridis et al. | |
| 2013/0210575 | A1* | 8/2013 | Kumazaki | B60K 6/48 |
| | | | | 477/20 |
| 2013/0297122 | A1* | 11/2013 | Gibson | B60W 20/40 |
| | | | | 701/22 |
| 2014/0066256 | A1* | 3/2014 | Yu | F02N 11/0822 |
| | | | | 477/204 |
| 2014/0290406 | A1 | 10/2014 | Hemphill | |
| 2015/0259008 | A1 | 9/2015 | Seguchi | |
| 2016/0052510 | A1* | 2/2016 | Aldrich, III | B60K 6/485 |
| | | | | 701/22 |

OTHER PUBLICATIONS

Romain Nicolas, posted Jan. 21, 2013, Stop and start system for automatic transmissions, http://www.car-engineer.com/stop-start-system-for-automatic-transmissions. (5 pages).

\* cited by examiner

METHOD FOR OPERATING AN AUTOMATIC START/STOP SYSTEM IN A VEHICLE UTILIZING A TORQUE CONVERTER

TECHNICAL FIELD

This disclosure relates to a method and a system for operating an automatic start/stop system in a motor vehicle having an internal combustion engine, a transmission and a torque converter with an impeller disconnect clutch.

BACKGROUND

Many automotive vehicles are equipped with an automatic start/stop system, which automatically shuts down and restarts the engine of a vehicle to reduce fuel consumption of the vehicle under certain conditions. In operation, the internal combustion engine can be stopped, i.e. switched off, automatically by the automatic start/stop system if no propulsion is required, for example by idling at a traffic light, and can be restarted if the driver calls for power again.

One type of start/stop system is known as a rolling start/stop. A rolling start/stop system involves stopping the internal combustion engine when the vehicle is moving and decelerating. When power from the engine is required, e.g., the driver releases the brakes, the engine is automatically restarted. The engine may also be automatically restarted in response to other conditions such as battery state of charge or loads on the electrical system. These engine auto stops may improve fuel economy and reduce emissions by reducing engine idle time and thus fuel consumption for the drive cycle. However, a rolling start/stop in a vehicle with an automatic transmission connected to the drivetrain via a conventional torque converter may result in objectionable noise, vibration, and harshness (NVH) or drivability. One strategy to mitigate these effects is to automatically shift the transmission into neutral, although this requires rapid reengagement when power is demanded and may result in a shift bump that is also objectionable to some occupants.

SUMMARY

A system and method for operating an automatic start/stop system in a motor vehicle having an internal combustion engine, a transmission, and a torque converter include operating an impeller disconnect clutch during a rolling auto stop event. Embodiments according to the present disclosure may be implemented in various applications to improve fuel economy and reduce emissions.

According to an embodiment of the present disclosure, a vehicle includes an engine and a torque converter. The torque converter includes an impeller, a turbine, a stator, a bypass clutch for selectively coupling the impeller and the turbine, and an impeller clutch for alternately engaging and disengaging a drive connection between the impeller and the engine. The vehicle also includes a controller programmed to initiate automatic stop of the engine and disengagement of the impeller clutch in response to a first brake pressure exceeding a pressure threshold and a vehicle speed exceeding a first speed threshold. The vehicle controller may be further programmed to initiate automatic stop of the engine and disengagement of the impeller clutch in response to the vehicle speed being below a second speed threshold.

In another embodiment, a start/stop system for a vehicle having an engine and a torque converter with an impeller clutch is disclosed. The start/stop system includes a controller programmed to control the impeller clutch to decouple an impeller of the torque converter from the engine. The impeller may be decoupled in response to the engine being automatically stopped when a first brake pressure exceeds a pressure threshold and a vehicle speed is above a first speed threshold but below a second speed threshold. The controller may be further programmed to control the impeller clutch to couple the impeller of the torque converter with the engine in response to a difference between the first brake pressure and a second brake pressure exceeding a corresponding threshold.

In yet another embodiment, a method for operating an automatic start/stop system in a vehicle having an engine and a torque converter with an impeller clutch is disclosed. The method includes controlling the torque converter to disengage the impeller clutch to decouple an impeller of the torque converter and the engine. This may be done in response to an automatic stop of the engine when a brake pressure exceeds a pressure threshold and a vehicle speed exceeds a speed threshold. The method may also include controlling the torque converter to maintain disengagement of the impeller clutch in response to a change in the brake pressure being below a threshold value. The method may further include controlling the torque converter to engage the impeller clutch to couple the impeller and the engine in response to the change in the brake pressure exceeding the threshold value.

Embodiments according to the present disclosure may provide a number of advantages. For example, control of an impeller clutch during a rolling stop-start may provide fuel savings and reduced emissions associated with decreased operation of the engine and reduced engine drag during vehicle deceleration. Reduced NVH during engine restart may improve customer satisfaction so that rolling stop-start operating modes may be readily accepted and employed by customers. Disconnecting the engine from the transmission using an impeller clutch may reduce engine, transmission, and connecting component wear. The above advantages and other advantages and features will be readily apparent from the following detailed description of the preferred embodiments when taken in combination with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles equipped with start/stop systems are powered by conventional internal combustion engines. A controller may initiate an automatic stop or start of the engine under certain operating conditions. For example, the start/stop system may automatically stop the engine when the vehicle is stopped or decelerating and the engine is not required for propulsion or other purposes. At a later time, the start/stop system may restart the engine when required for propulsion or other purposes, e.g., when the brake pedal is released and/or the accelerator pedal is actuated. By disabling the engine when possible, overall fuel consumption is reduced.

One type of start/stop system is known as a rolling start/stop ("RSS"). A RSS system involves stopping the internal combustion engine when the vehicle is moving. In particular, a vehicle equipped with RSS technology is configured to shut down the engine below a defined vehicle speed threshold as the driver applies the brakes. The defined vehicle speed threshold at which a RSS strategy can be implemented is based on the vehicle application. One of the challenges with RSS technology in vehicles equipped with automatic transmissions is that during a RSS event the engine stays rigidly connected to the drivetrain through use of a conventional torque converter. When the engine is automatically stopped after application of the brake or while a vehicle is idling at a traffic light, a conventional torque converter is still pumping fluid but no useful work is being done, reducing the fuel economy. Accordingly, embodiments of the present disclosure provide systems and methods for implementing a RSS strategy in a vehicle with an automatic transmission that improve fuel economy without drivability impact through use of a torque converter with an impeller disconnect clutch.

Figure 1:
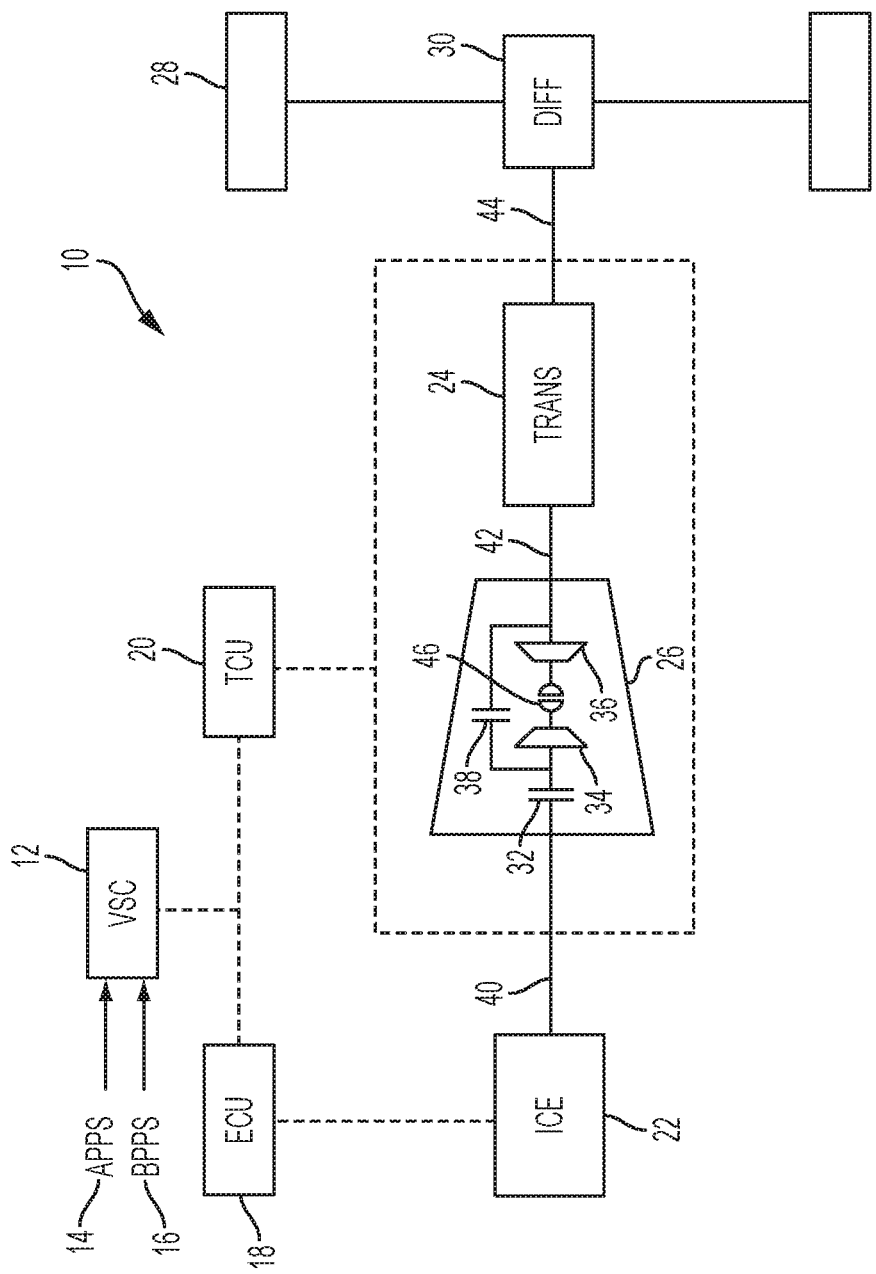
FIG. 1 is a schematic representation of a vehicle powertrain system according to an embodiment of the present disclosure.

Referring to FIG. 1, a schematic diagram of a vehicle powertrain 10 is illustrated according to an embodiment of the present disclosure. FIG. 1 illustrates representative relationships among the components. Physical placement and orientation of the components within the vehicle may vary. The vehicle powertrain 10 includes a vehicle system controller (VSC) 12 that has appropriate logic/controls for implementing an engine start/stop system. The VSC 12 receives signals from an accelerator pedal position sensor (APPS) 14 and a brake pedal position sensor (BPPS) 16 to determine vehicle acceleration and deceleration demands.

The vehicle powertrain 10 includes an engine 22 that drives transmission 24. An engine control unit (ECU) 18 is configured to control the engine 22 and a transmission control unit (TCU) 20 is configured to control operation of the transmission 24 and torque converter 26. The VSC 12 transfers data between the TCU 20 and ECU 18 and is also in communication with various vehicle sensors. Engine 22 generates mechanical power by converting stored chemical energy in a fuel source. Transmission 24 adapts the speed and torque of the mechanical power produced by the engine 22 to suit the current needs of the vehicle. Mechanical power from transmission 24 is routed to wheels 28 by differential 30.

The transmission, or gearbox, 24 may include gear sets (not shown) that are selectively placed in different gear ratios by selective engagement of friction elements such as clutches and brakes (not shown) to establish the desired drive ratios. The transmission 24 is automatically shifted from one ratio to another based on various vehicle and ambient operating conditions by an associated controller, such as TCU 20. The transmission, or gearbox, 24 then provides powertrain output torque to output shaft 44.

Torque converter 26 transmits power and torque from engine crankshaft 40 to transmission input shaft 42 of transmission 24. The torque converter 26 may include an impeller clutch 32, impeller 34, turbine 36, and stator 46. The impeller clutch 32 of the torque converter 26 may be controlled to selectively couple the engine 22 with the impeller 34 and transmission 24. A bypass clutch 38 may also be provided that, when engaged, frictionally or mechanically couples the impeller 34 to the turbine 36 of the torque converter 26. The bypass or lock-up clutch 38 for the torque converter 26 may be selectively engaged to create a mechanical connection between the impeller side and the turbine side of the torque converter 26 for direct torque transfer.

In general, the control system for the vehicle powertrain 10 may include any number of controllers, such as VSC 12, ECU 18 and TCU 20, and may be integrated into a single controller, or have various modules. Some or all of the controllers may be connected by a controller area network (CAN) or other system. The control system may be configured to control operation of various components of the transmission 24, torque converter 26 and engine 22 under any of a number different conditions, including an engine start/stop system. The control system, including VSC 12, ECU 18 and TCU 20, may implement an engine start/stop system by, at appropriate times, stopping engine 22 by halting fuel and restarting the engine 22 when propulsion is required.

The control system controls various actuators in response to signals from various sensors to control functions such as starting/stopping engine 22, operating impeller clutch 32 of torque converter 26 to selectively decouple impeller 34 from the driveline, selecting or scheduling transmission shifts, etc. The control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 2:
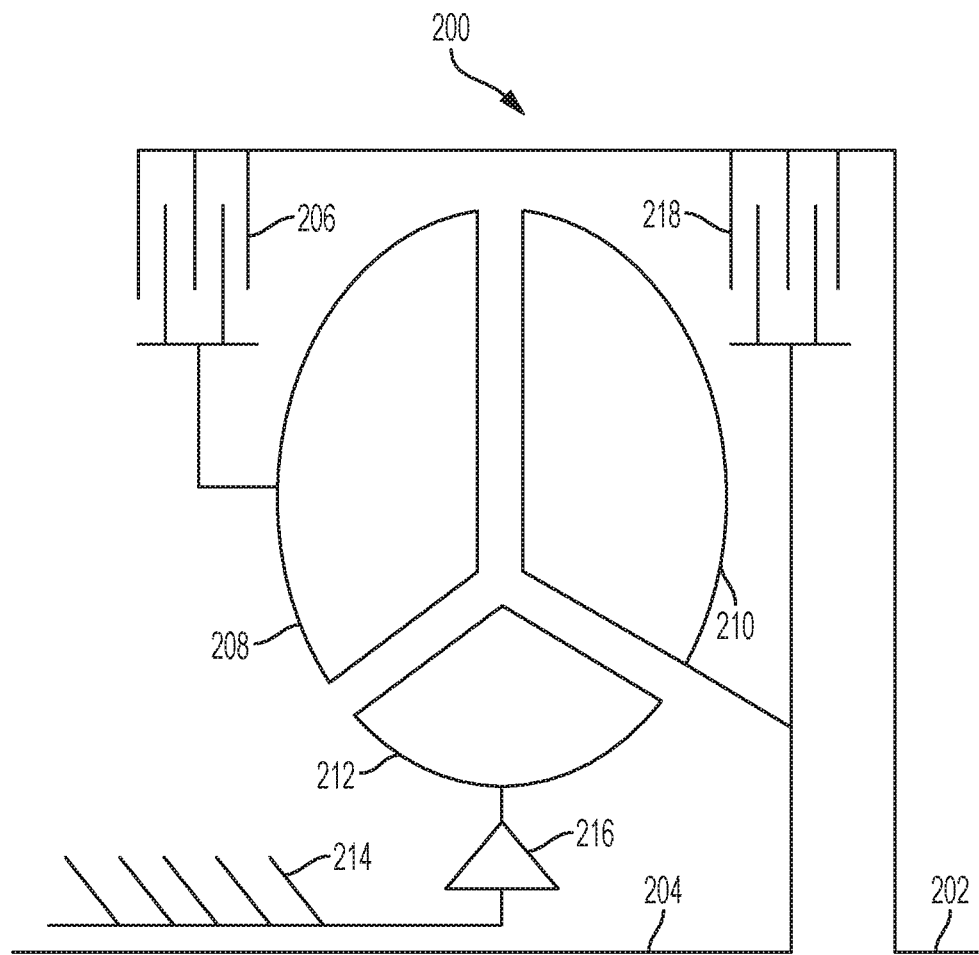
FIG. 2 is a schematic representation of a torque converter having an impeller clutch according to one or more embodiments of the present disclosure.

FIG. 2 schematically illustrates a torque converter 200 according to one or more embodiments of the present disclosure. Torque converter 200 provides two parallel power flow paths from engine crankshaft 202 to transmission input shaft 204. A hydrodynamic power flow path includes impeller clutch 206, impeller 208, and turbine 210. Impeller 208 is selectively coupled to engine crankshaft 202 by impeller clutch 206. An impeller clutch 206 is an actively controlled friction clutch that selectively couples an impeller 208 of the torque converter 200 to the engine crankshaft 202. Turbine 210 is fixedly coupled to transmission input shaft 204. Stator 212 is coupled to transmission housing 214 by passive one-way clutch 216. At low turbine shaft speeds, when impeller clutch 206 is at least partially engaged, impeller 208 causes fluid to flow around the torus from impeller 208 to turbine 210 to stator 212 and back to impeller 208. Stator 212 is held against rotation by one-way clutch 216 such that it can redirect the flow and provide a reaction torque for torque multiplication. As the speed of turbine 210 approaches the speed of impeller 208, fluid in the torus flows circumferentially around the input shaft with the impeller 208 and turbine 210. One-way clutch 216 then overruns such that stator 212 can rotate rather than impeding this flow. Engine crankshaft 202 is selectively coupled to transmission input shaft 204 by bypass clutch 218 providing a second power flow path. To improve power transfer efficiency once the vehicle reaches a sufficient speed, the controller may engage bypass clutch 218 to selectively couple engine crankshaft 202 to transmission input shaft 204.

Both impeller clutch 206 and bypass clutch 218 are actively controlled friction clutches with torque capacities that respond to changes in fluid pressure in hydraulic circuits. The hydraulic circuits may be dedicated circuits whose only function is to control the clutch. Alternatively, the hydraulic circuits may also be used for other functions such as supplying fluid to the torque converter torus. When the torque capacity is commanded to zero, the elements that are selectively coupled by the clutch are free to rotate at different speeds and the only torque transferred is a small parasitic drag torque. This is called an open state. In a partially engaged state, the elements selectively coupled by a clutch are rotating at different speeds and the clutch capacity is greater than zero. A torque equal to the clutch torque capacity is applied to the slower element and a torque in the opposite direction is applied to the faster element. When the elements are rotating at the same speed, the clutch is said to be fully engaged. In the fully engaged state, the transmitted torque is determined by the torques applied to the elements by other components. However, if that torque exceeds the clutch torque capacity, then slip develops between the elements and the clutch transitions to the partially engaged state.

The control logic or functions described above may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used.

Figure 3:
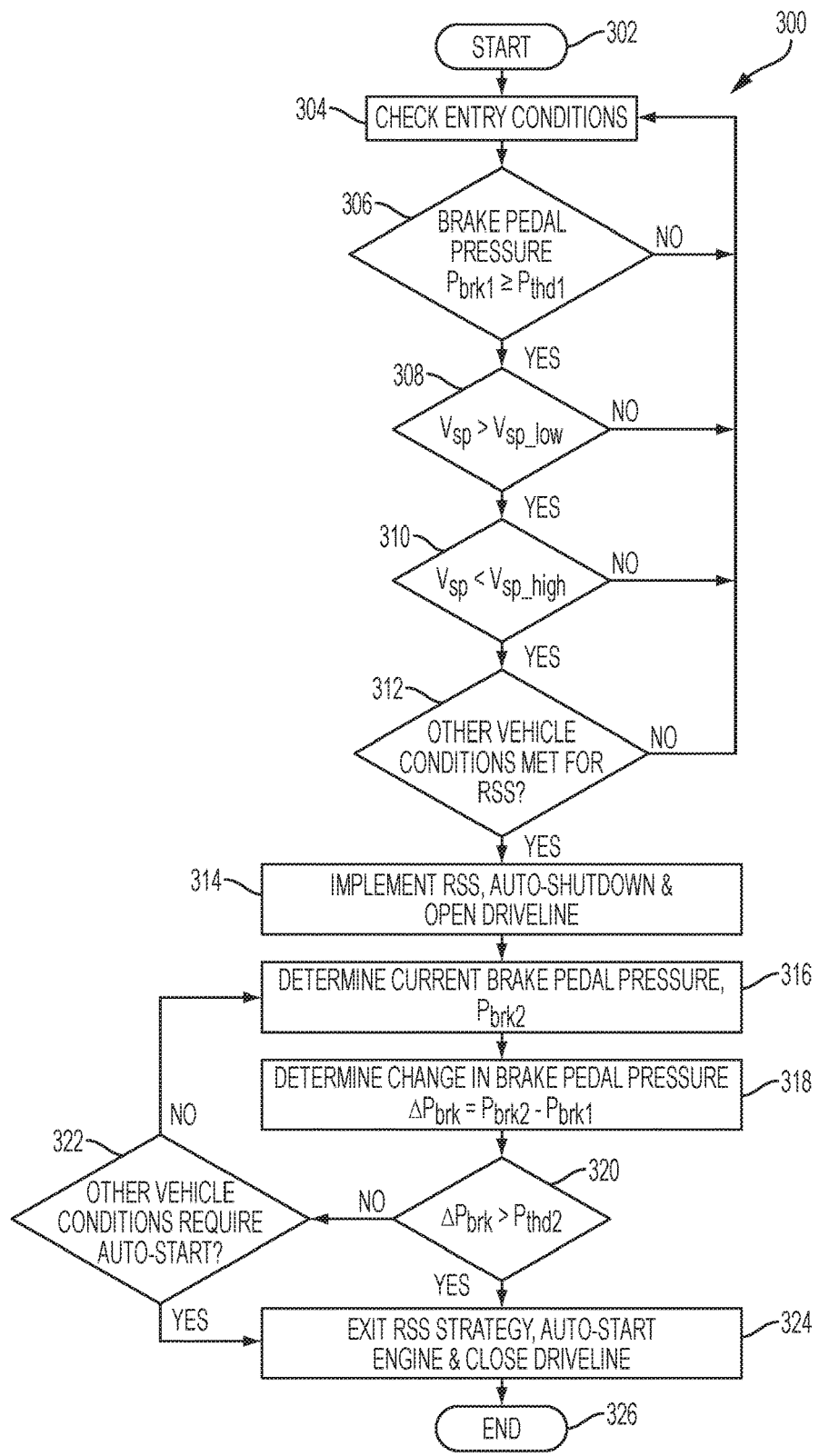
FIG. 3 is a flowchart illustrating a method for operating an engine start/stop system utilizing a torque converter with an impeller clutch according to a representative embodiment of the present disclosure.

Referring to FIG. 3, a control algorithm 300 illustrating a method for operating an engine start/stop system utilizing a torque converter with an impeller clutch is described. The control algorithm begins at block 302. A set of entry conditions are then evaluated at blocks 304-312. At decision block 306, a first brake pressure $P_{brk1}$ is compared with a first pressure threshold $P_{thd1}$. The first pressure threshold $P_{thd1}$ is a value associated with a driver's intent to begin a rolling auto stop event. If the first brake pressure $P_{brk1}$ is less than the first pressure threshold $P_{thd1}$ at decision block 306, then the control algorithm returns to the beginning to evaluate the entry conditions again at block 304. If the first brake pressure $P_{brk1}$ is greater than or equal to the first pressure threshold $P_{thd1}$ at decision block 306, then the control algorithm compares a vehicle speed $V_{sp}$ with a low-speed threshold $V_{sp\_low}$ at block 308. The low-speed threshold $V_{sp\_low}$ may be a value associated with vehicle idle speed.

If the vehicle speed $V_{sp}$ is less than the low-speed threshold $V_{sp\_low}$ at decision block 308, then the control algorithm returns to the beginning to evaluate the entry conditions again at block 304. If the vehicle speed $V_{sp}$ is greater than the low-speed threshold $V_{sp\_low}$ at decision block 308, then the control algorithm compares the vehicle speed $V_{sp}$ to a high-speed threshold $V_{sp\_high}$ at block 310. The high-speed threshold $V_{sp\_high}$ is a value associated with a maximum vehicle speed at which a rolling start/stop mode can be executed. If the vehicle speed $V_{sp}$ is greater than the high-speed threshold $V_{sp\_high}$ at block 310, then the control algorithm returns to the beginning to evaluate the entry conditions again at block 304. If the vehicle speed $V_{sp}$ is less than the high-speed threshold $V_{sp\_high}$ at block 310, then the control algorithm evaluates other vehicle conditions to determine whether the engine can be shutdown. Other vehicle conditions may include the battery state of charge, loads on the electrical system, catalyst temperature, etc.

If other vehicle conditions indicate that the engine should not be stopped at this time, then the control algorithm returns to the beginning to evaluate the entry conditions again at block 304. Whereas, if at decision block 312 it is determined after evaluating other vehicle conditions that the engine can be shutdown, then a rolling start/stop ("RSS") strategy is implemented at block 314. During implementation of RSS mode, the engine is automatically shut down and the impeller clutch of the torque converter is commanded to disengage to decouple the impeller and the engine (i.e., driveline is opened). Then the control algorithm determines a current brake pedal pressure $P_{brk2}$ at block 316 and then calculates a difference $\Delta P_{brk}$ between the current brake pedal pressure $P_{brk2}$ and the first brake pedal pressure $P_{brk1}$ at block 318.

The change or difference $\Delta P_{brk}$ between the current brake pedal pressure $P_{brk2}$ and the first brake pedal pressure $P_{brk1}$ is then compared with a corresponding pressure threshold $P_{thd2}$ at decision block 320. The corresponding pressure threshold $P_{thd2}$ is a value associated with a driver's intent to exit the rolling auto stop event. If the change in brake line pressure $\Delta P_{brk}$ exceeds the threshold $P_{thd2}$, then this indicates a driver's intent to exit the rolling auto stop event and the control algorithm then exits the RSS strategy at block 324. The engine is then restarted and the driveline is closed i.e., the impeller clutch is engaged to couple the impeller and engine. If the change in brake line pressure $\Delta P_{brk}$ is below the corresponding pressure threshold $P_{thd2}$ at block 320, then this indicates a driver's intent to continue the rolling auto stop event and the control algorithm then evaluates at decision block 322 whether other vehicle conditions require the engine to be restarted.

Other vehicle conditions may include the battery state of charge, loads on the electrical system, catalyst temperature, etc. For example, the controller may determine whether a vehicle power demand exceeds a currently available electrical power, where the vehicle power demand is based on an amount of electrical energy required to power vehicle accessory loads and subsystems. If this is the case, then the engine may need to be restarted to meet the vehicle power demand.

Likewise, the controller may determine that the engine should be restarted in response to a battery voltage corresponding to a threshold limit.

If other vehicle conditions require the engine to be restarted at decision block 322, then the control algorithm exits the RSS strategy, restarts the engine and the impeller clutch is engaged to close the driveline to couple the torque converter impeller with the engine at block 324. If other vehicle conditions do not require the engine to be restarted at decision block 322, then the control algorithm returns to block 316 to keep evaluating the current brake pedal pressure $P_{brk2}$ and any subsequent change in the brake line pressure $\Delta P_{brk}$. The control strategy ends at block 326.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
    an engine;
    a torque converter including an impeller, a turbine, a stator, a bypass clutch for selectively coupling the impeller and the turbine, and an impeller clutch for alternately engaging and disengaging a drive connection between the impeller and the engine; and
    a vehicle controller programmed to
        initiate automatic stop of the engine and disengagement of the impeller clutch in response to a first brake pressure exceeding a pressure threshold and a vehicle speed exceeding a first speed threshold, and
        initiate engagement of the impeller clutch in response to a difference between a second brake pressure and the first brake pressure exceeding a corresponding threshold.

2. The vehicle of claim 1, wherein the vehicle controller is further programmed to initiate automatic stop of the engine and disengagement of the impeller clutch in response to the vehicle speed being below a second speed threshold.

3. The vehicle of claim 1, wherein the vehicle controller is further programmed to initiate automatic restart of the engine in response to a difference between a second brake pressure and the first brake pressure exceeding a corresponding threshold.

4. The vehicle of claim 1, wherein the vehicle controller is further programmed to initiate engagement of the impeller clutch and restart of the engine in response to a vehicle power demand exceeding a currently available electrical power.

5. The vehicle of claim 4, wherein the vehicle power demand is determined from an amount of electrical energy required to power vehicle accessory loads.

6. The vehicle of claim 1, wherein the vehicle controller is further programmed to initiate restart of the engine and engagement of the impeller clutch in response to an accelerator pedal being actuated.

7. The vehicle of claim 1, wherein the first speed threshold is based on a vehicle idle speed.

8. A stop-start system for a vehicle having an engine and a torque converter with an impeller clutch, comprising:
    a controller programmed to control the impeller clutch to decouple an impeller of the torque converter from the engine in response to the engine being automatically stopped as a result of a first brake pressure exceeding a pressure threshold and a vehicle speed exceeding a first speed threshold but not a second speed threshold.

9. The stop-start system of claim 8, wherein the controller is further programmed to control the impeller clutch to couple the impeller of the torque converter with the engine in response to a difference between the first brake pressure and a second brake pressure exceeding a corresponding threshold.

10. The stop-start system of claim 8, wherein the controller is further programmed to automatically restart the engine and couple the impeller to the engine in response to an accelerator pedal being actuated.

11. The stop-start system of claim 8, wherein the controller is further programmed to couple the impeller to the engine and automatically restart the engine in response to a battery voltage corresponding to a threshold limit.

12. The stop-start system of claim 8, wherein the controller is further programmed to maintain disengagement of the impeller clutch in response to a difference between a second brake pressure and the first brake pressure being below a threshold value.

13. The stop-start system of claim 12, wherein the controller is further programmed to maintain disengagement of the impeller clutch in response to a vehicle power demand being less than a currently available electrical power.

14. A method for operating an automatic stop and start system in a vehicle having an engine and a torque converter with an impeller clutch, comprising:
    controlling the torque converter to disengage the impeller clutch to decouple an impeller of the torque converter and the engine in response to an automatic stop of the engine that is caused by a brake pressure exceeding a pressure threshold and a vehicle speed exceeding a speed threshold.

15. The method of claim 14, further comprising:
    controlling the torque converter to maintain disengagement of the impeller clutch in response to a change in the brake pressure being below a threshold value.

16. The method of claim 15, further comprising:
    controlling the torque converter to engage the impeller clutch to couple the impeller and the engine in response to the change in the brake pressure exceeding the threshold value.

17. The method of claim 14, further comprising:
    controlling the torque converter to engage the impeller clutch to couple the impeller and the engine in response to an accelerator pedal being actuated.

18. The method of claim 14, further comprising:
    controlling the torque converter to engage the impeller clutch to couple the impeller and the engine in response to a vehicle power demand exceeding a currently available electrical power.

19. The method of claim 14, wherein the speed threshold is based on a speed value associated with vehicle idle.

* * * * *